US012612968B2

(12) United States Patent
Miller

(10) Patent No.: US 12,612,968 B2
(45) Date of Patent: Apr. 28, 2026

(54) ELECTRONIC PARK PAWL MOTOR DIRECT OVERRIDE

(71) Applicant: FCA US LLC, Auburn Hills, MI (US)

(72) Inventor: Mark J Miller, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 355 days.

(21) Appl. No.: 18/345,056

(22) Filed: Jun. 30, 2023

(65) Prior Publication Data

US 2025/0003492 A1 Jan. 2, 2025

(51) Int. Cl.
*F16H 63/48* (2006.01)
*F16H 63/34* (2006.01)

(52) U.S. Cl.
CPC ....... *F16H 63/483* (2013.01); *F16H 63/3466* (2013.01); *F16H 63/3491* (2013.01)

(58) Field of Classification Search
CPC ............... F16H 63/483; F16H 63/3433; F16H 63/3491; F16H 63/3466; F16H 63/3483; F16H 57/04; F16H 57/0473; F16H 61/0206; F16H 61/0021; F16H 61/0031; F16H 2061/0031; F16H 2061/0034; F16H 2061/0037; F16H 2061/1232; F16H 2061/1291; F16H 2061/1292; F16H 2061/1244
See application file for complete search history.

(56) References Cited

U.S. PATENT DOCUMENTS

| | | | | |
|---|---|---|---|---|
| 10,829,109 B2* | 11/2020 | Manivasagam | ......... | F16H 63/48 |
| 2015/0308571 A1* | 10/2015 | Wyatt | ................. | F16H 63/3491 |
| | | | | 192/219.5 |
| 2016/0053890 A1* | 2/2016 | Hathaway | ............... | F16H 63/48 |
| | | | | 701/53 |
| 2018/0156333 A1* | 6/2018 | Al-Regib | ............ | F16H 63/3416 |
| 2018/0345931 A1* | 12/2018 | Harries | .................. | B60T 8/885 |
| 2020/0088296 A1* | 3/2020 | Tucco | ................. | F16H 63/3425 |
| 2020/0346629 A1* | 11/2020 | Repko | ................. | F16H 63/3425 |
| 2024/0309948 A1* | 9/2024 | Gudapati | ............ | F16H 63/3433 |

* cited by examiner

*Primary Examiner* — Hai H Huynh
*Assistant Examiner* — Johnny H Hoang
(74) *Attorney, Agent, or Firm* — Jeremy J. Klobucar

(57) ABSTRACT

A park pawl motor override system and corresponding method of use includes utilizing a park pawl override tool to selectively engage and/or disengage a park pawl mechanism under certain vehicle conditions including loss of 12V power and/or loss of vehicle serial communication; disengaging a 12V power supply of the vehicle from a wiring harness; coupling the override tool to a vehicle breakout interface, where the vehicle includes a dedicated, direct communication and power connection between the breakout interface and the park pawl mechanism; coupling an off-vehicle 12V power supply to the override tool; and operating the override tool to provide power and control signals to the park pawl mechanism to control the park pawl mechanism to selectively move to a disengaged position and/or to an engaged position while the vehicle is under the loss of 12V power and/or loss of vehicle serial communication with the park pawl mechanism.

15 Claims, 5 Drawing Sheets

ELECTRONIC PARK PAWL MOTOR DIRECT OVERRIDE

FIELD

The present application relates generally to electric park pawl systems for transmissions or electronic drive modules of vehicles and, more particularly, to systems and methods for an electric park pawl motor direct override.

BACKGROUND

Today's automotive vehicles often include a transmission or electric drive module having an electronic park pawl system. With such park pawl systems, when there is a loss of 12V power, serial communications, and/or other faulted conditions, the electronic park pawl system is susceptible to park pawl engagement. As a result of this situation, the vehicle is not mobile and thus the operator could become stranded. Previous solutions to this situation include flatbed towing, a physical cable connection with the park pawl mechanism for manual release, and a screw engagement/disengagement mechanism. The cable attachment solutions are costly and difficult to package/route in the vehicle. In addition, the cable does not provide a means of reengagement of the park pawl thus leaving the vehicle potentially unsecured. The screw mechanisms require an individual to crawl under the vehicle creating a potentially unsafe working environment. Further, this solution does not provide a visual indication that the park pawl system has engaged/disengaged, which could result in damage to the vehicle and a potentially unsecured vehicle. Flatbed towing would still require some amount of "dragging" of the vehicle due to at least one of the axles being locked from rotation, which would result in damage to the rear tires. Thus, while such conventional solutions do work for their intended purpose, there remains a desire for improvement in the relevant art.

SUMMARY

According to one example aspect of the invention, an override system for an electronic park pawl system of a vehicle is provided. In one exemplary implementation, the override system includes: a park pawl override tool configured to selectively engage and disengage a park pawl mechanism of the electronic park pawl system under certain vehicle conditions including loss of 12V power and/or loss of vehicle serial communication with at least the electronic park pawl system; a breakout interface configured to receive the override tool; and a dedicated, direct communication and power connection between the breakout interface and the electronic park pawl system; wherein with the override tool coupled to the breakout interface, the override tool is configured to facilitate power and control signal communication to the electronic park pawl system to control the park pawl mechanism to selectively move to a disengaged position and/or to an engaged position while the vehicle is under the conditions of loss of 12V power and/or loss of vehicle serial communication with at least the electronic park pawl system.

In some implementations, the override tool includes a directional input switch, a 12V auxiliary power connection, and a control system in communication with the directional input switch, the 12V auxiliary power connection, and the electronic park pawl system when the override tool is coupled to the breakout interface.

In some implementations, the control system is configured to receive a signal from the directional input switch indicative of at least a direction of movement of the park pawl mechanism and command the park pawl to move in said direction of movement.

In some implementations, an auxiliary, off-vehicle 12V power supply is configured to be connected to the 12V auxiliary power connection to provide a supply of power to the override tool.

In some implementations, the override tool includes a display in signal communication with the control system and configured to provide a visual indication of a position and direction of movement of the park pawl mechanism relative to and including positions of full engagement and disengagement.

In some implementations, the electronic park pawl system includes one or more position sensors in signal communication with the direct communication and power connection and configured to provide position and direction of movement information to the control system of the override tool. In some implementations, the one or more position sensors includes a quadrature sensor.

In some implementations, the dedicated, direct communication and power connection between the breakout interface and the electronic park pawl system is in addition to a wiring harness and controller area network communication system provided with the vehicle. In some implementations, the breakout interface is positioned in a glove box area in an interior of the vehicle.

According to another example aspect of the invention, a method of using an override system to control an electronic park pawl system of a vehicle is provided. In one exemplary implementation, the method includes providing a park pawl override tool configured to selectively engage and disengage a park pawl mechanism of the electronic park pawl system under certain vehicle conditions including loss of 12V power and/or loss of vehicle serial communication with at least the electronic park pawl system; disengaging a 12V power supply of the vehicle from a wiring harness of the vehicle; coupling the park pawl override tool to a breakout interface on the vehicle that is configured to receive the park pawl override tool, wherein the vehicle includes a dedicated, direct communication and power connection between the breakout interface and the electronic park pawl system; coupling an auxiliary, off-vehicle 12V power supply to the park pawl override tool; and operating the park pawl override tool to provide power and control signal communication to the electronic park pawl system to control the park pawl mechanism to selectively move to a disengaged position and/or to an engaged position while the vehicle is under the conditions of loss of 12V power and/or loss of vehicle serial communication with at least the electronic park pawl system.

In some implementations, the override tool includes a display and the override tool is configured to provide a visual indication of a position and a direction of movement of the park pawl mechanism to the display so as to be viewable by an operator of the override tool.

In some implementations, the method includes accessing the breakout interface in a glove box area of an interior of the vehicle. In some implementations, the dedicated, direct communication and power connection between the breakout interface and the electronic park pawl system is in addition to and distinct from the wiring harness provided with the vehicle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, there is a need for an improved park pawl override tool/system that overcomes the afore-mentioned drawbacks associated with currently available park pawl override solutions. These drawbacks include, but are not limited to, additional vehicle complexity and pack-aging challenges, limited access ability to mechanical solu-tions under the vehicle, the inability to conveniently ascer-tain the location of the park pawl, and an inability to conveniently reengage the park pawl mechanism.

As a result, improved park pawl override systems and methods are presented herein, noting that, in certain instances, such systems and/or methods may hereinafter also be referred to as "techniques". In an example implementa-tion, the techniques include use of a park pawl override tool that is a portable control device configured to directly communicate with the electronic park pawl system (e.g., its motor) to selectively disengage (and potentially reengage) the park pawl when the vehicle experiences situations that result in the park pawl being in an engaged state such that the vehicle is not mobile (e.g., wheels of one or more axles are prevented from rotating).

Such situations can include, but are not limited to, loss of primary (OEM provided) vehicle 12V power and/or loss of serial communication with at least the park pawl system via the OEM provided wiring and communication harnesses/networks. In an example implementation, the park pawl override tool includes terminals for connection of an auxil-iary 12V power source not associated with the vehicle and an interface, such as a screen, for display of a position of the park pawl mechanism relative to states of engagement and disengagement.

Figure 1:
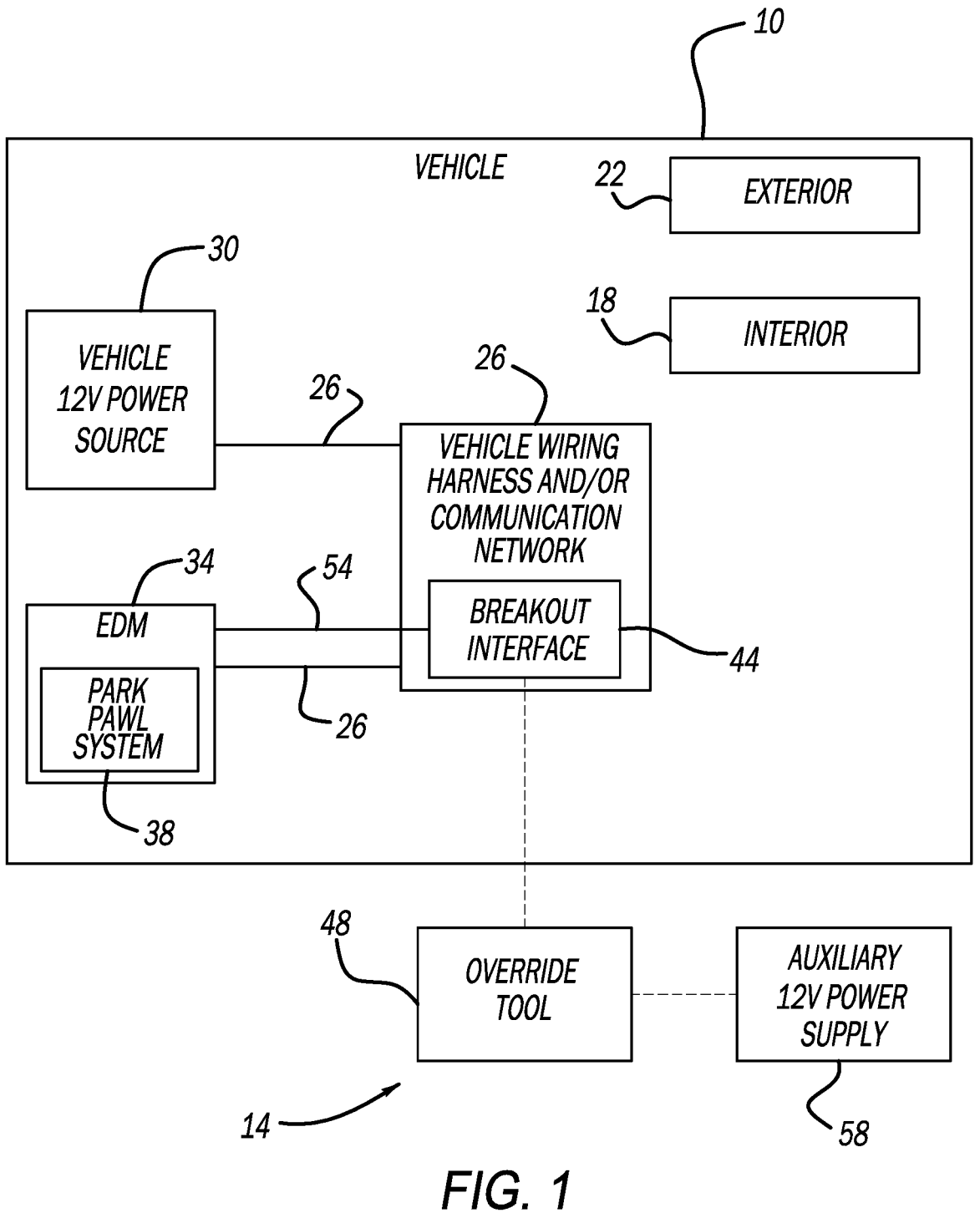
FIG. 1 is a high-level schematic diagram of a vehicle having an electric drive module with an electronic park pawl system and an exemplary override system for the same according to the principles of the present application.
Figure 2:
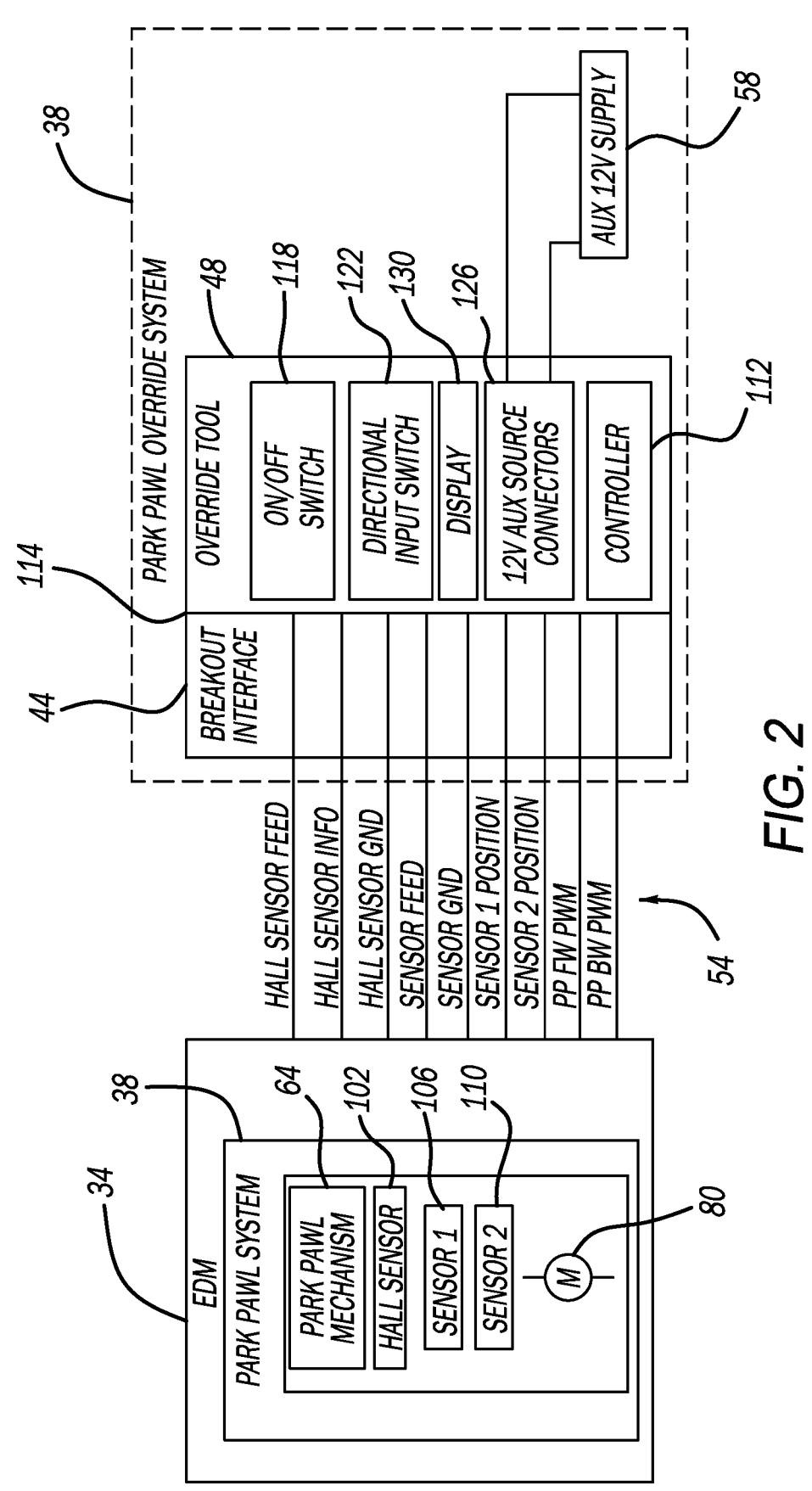
FIG. 2 is a high-level schematic diagram of an exemplary interface and communication between the electronic drive module and park pawl override tool of FIG. 1 according to the principles of the present application.

Turning now to the drawings, FIG. 1 is a high-level schematic illustration of an example vehicle 10 and an example park pawl override system 14 (which is shown in complete detail in FIG. 2). In this example, vehicle 10 includes an interior 18, an exterior 22, and a wiring harness and communication network 26 in communication with a primary 12V power source 30 provided with the vehicle 10 and an electronic drive module (EDM) 34. The EDM 34 includes, among other features and components, an elec-tronic park pawl system 38. The wiring harness and com-munication network 26 can be a typical or conventional wiring harness and communication network, such as a CAN bus, provided in the vehicle 10 by an OEM of the same. As will be appreciated, such a wiring harness and communica-tion network 26 is in communication with multiple vehicle components, control modules, etc.

As part of the wiring harness and communication network 26 or in addition thereto, the park pawl override system 14 includes a breakout interface or connection 44 for use with a park pawl override tool 48 of the park pawl override system 14. The breakout connection 44 includes a direct connection 54 with the park pawl system 38. In one imple-mentation, this direct connection 54 is in addition to and can be independent of the vehicle wiring harness and commu-nication network 26, so as to not be subject to or inhibited by a loss of power from the primary 12V battery power source 30 and/or a failure in the communication network 26 that could prevent communication with the park pawl sys-tem 38. As can also be seen in FIG. 1 and will be explained in more detail herein, the park pawl override system 14 also facilitates connection to an independent, off-vehicle, auxil-iary power source 58 for use in powering the park pawl system 38 when power is not available from the conven-tional vehicle 12V power source 30.

Figure 3:
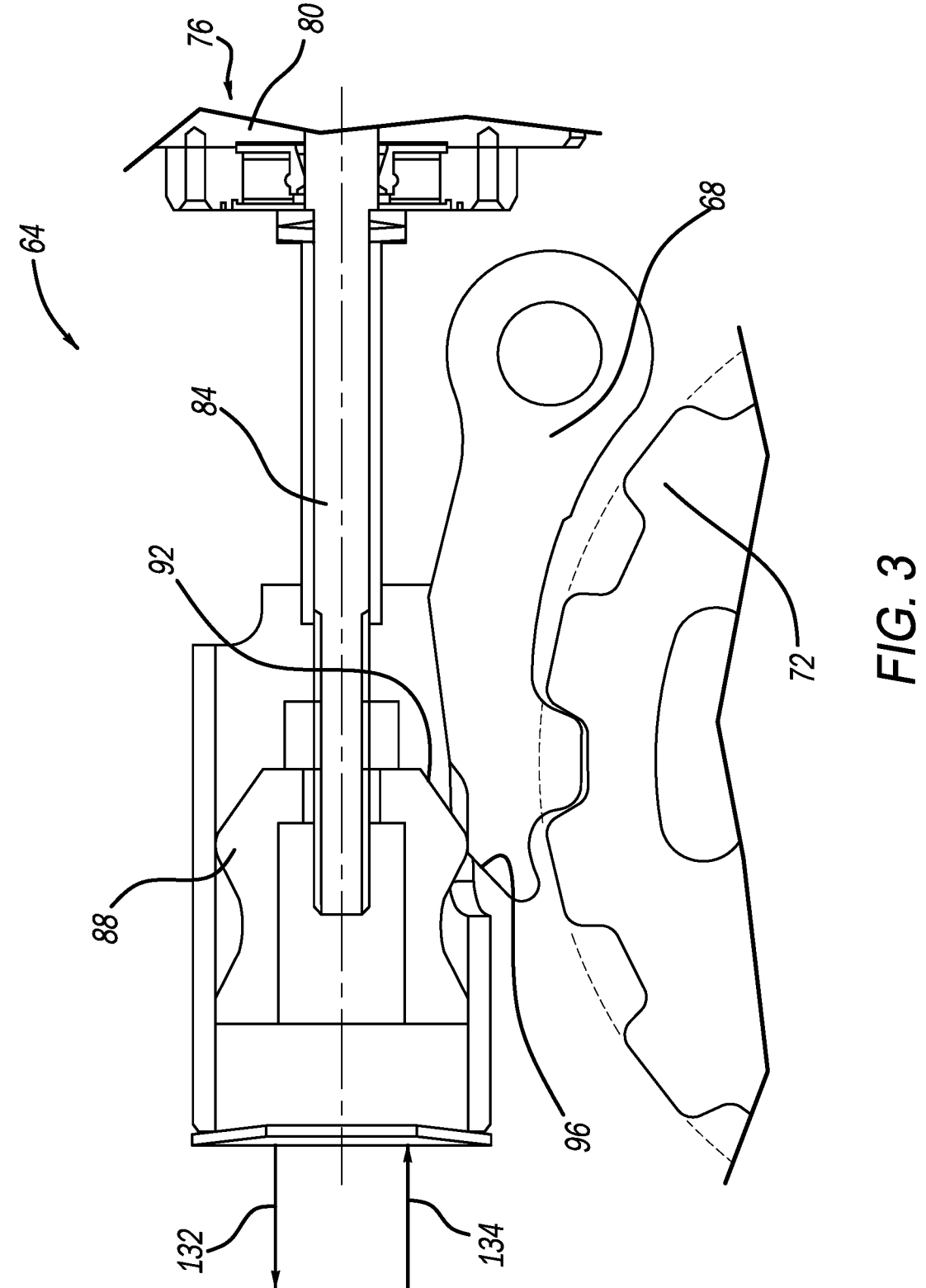
FIG. 3 is a partial illustration of an example electronic park pawl mechanism according to the principles of the present application.

With additional reference to FIGS. 2 and 3 and continuing reference to FIG. 1, the park pawl system 38 can include a park pawl mechanism 64 having a park pawl 68 configured to engage a park wheel 72 and a movement system 76 for selectively controllably engaging and disengaging the park pawl 68 with the park wheel 72. In one example implemen-tation, the movement system 76 includes an electric motor 80, a drive spindle 84 coupled thereto and to an actuator cone 88. The actuator cone 88 can include an angled surface 92 configured to engage a corresponding surface 96 of the park pawl 68 such that when the motor 80 drives the actuator cone 88 in one direction, the park pawl 68 disengages from the park wheel 72. When the motor 80 drives the actuator cone 88 in the opposite direction, the park pawl 68 will be moved into reengagement with the park wheel 72. It will be appreciated that various different park pawl system engage-ment/disengagement structures may be utilized within the scope of the invention discussed herein so long as they are electronically operated, such as via an electric motor.

The park pawl system 38 can also include various sensors to facilitate movement and/or tracking of movement of the actuator cone 88, which corresponds directly to movement of the park pawl 68. In this way, such various sensors can also be considered part of the park pawl override system 14. In one example implementation, the park pawl system 38 and/or park pawl override system 14 includes a Hall Effect sensor 102 and two position sensors 106 and 110 configured to provide at least the position of the park pawl 68 relative to full engagement and full disengagement. In one example, the two position sensors 106, 110 are quadrature sensors configured to indicate position, speed and displacement of the actuator cone e 88, which directly corresponds to the same measurements/values for the park pawl 68.

With particular reference to FIG. 2 and continuing reference to FIGS. 1 and 3, the park pawl override tool 48 will now be discussed in greater detail. In the example illustrated, the park pawl tool is a portable device housing or having a controller 112, connection ports 114 complimentary to those of the breakout interface or connector port 44, an activation or on/off switch 118, a directional input switch 122, connectors 126 for selective coupling of the off-vehicle, auxiliary power source 58 to the override tool 48, and a display 130. The on/off switch activates or deactivates the override tool.

The directional input switch 122 can be provided in various forms including a rotary knob for turning in a first direction (e.g., clockwise) for commanding the electric motor 80 to rotate in a first direction for moving the activation cone 88 in a first direction 132 so as to disengage the park pawl 68. The rotary knob can be similarly turn or rotated in an opposite second direction (e.g., counterclockwise) for commanding the electric motor 80 to rotate in a second direction for moving the activation cone 88 in a second direction 134 so as to engage/reengage the park pawl 68. The display 130 can be a digital display in the form of a flat screen and can display position, speed of movement and displacement information for the park pawl 68 derived from the actuator cone 88 position, speed and displacement. In this way, a user can be provided with a visual indication of the direction of movement (engagement or disengagement) of the park pawl 68 and when it is in full engagement or disengagement as well as its positions therebetween.

Figure 4:
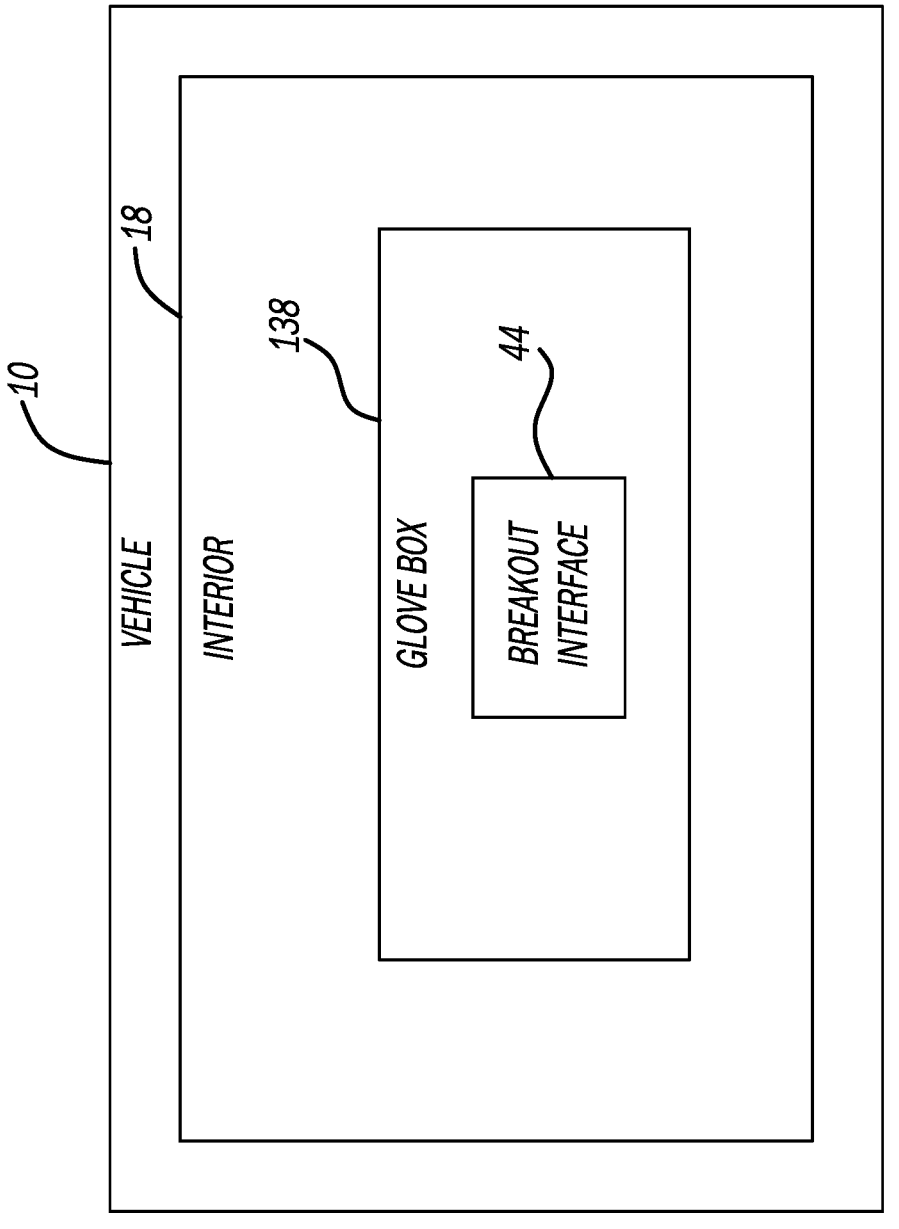
FIG. 4 is a high-level schematic diagram of an example placement of a breakout interface in an interior location of the vehicle according to the principles of the present application.

With additional reference to FIG. 4, the breakout interface or connector 44 can be located in various areas of the vehicle that provide for secure access. In one example implementation, the breakout interface 44 can be located in a glove box area 138 of the interior 18 of the vehicle 10. Providing the breakout interface 44 in the glove box area 136 provides secure access (e.g., in a lockable interior area of the vehicle) while also being selectively hidden from view (e.g., when the glove box door is closed) but also easily accessible if/when needed. It will be appreciated that the above-discussed glove box area 136 is just one example of numerous location options in the interior 18 of the vehicle 10. Another option could be in an exterior area 22 of the vehicle that has security features and is selectively accessible. One such area could be inside a lockable and/or controlled access charge port door on the exterior 22 of the vehicle 10.

Figure 5:
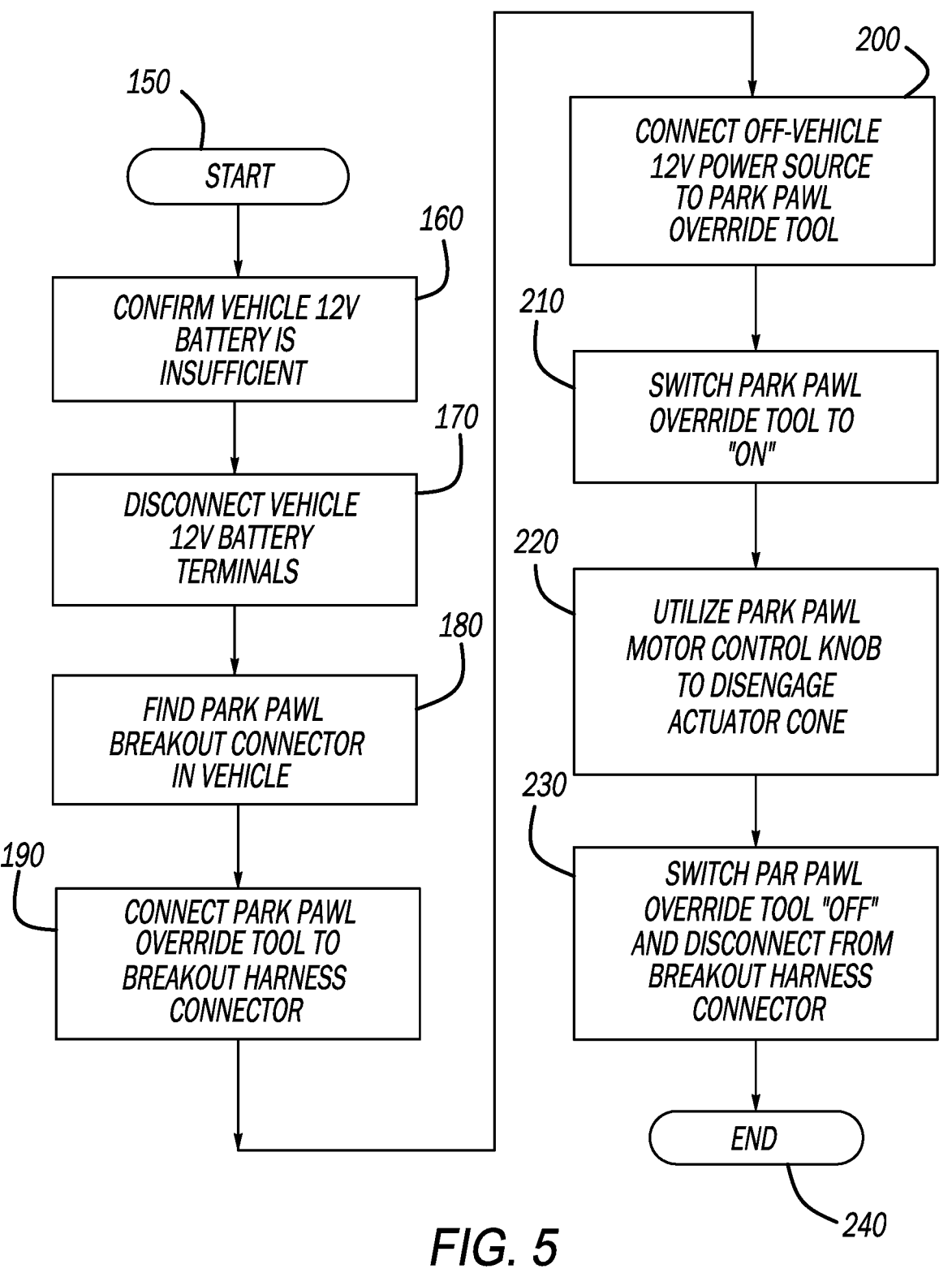
FIG. 5 is an exemplary method using the override tool and system to disengage a park pawl of the park pawl mechanism when the vehicle 12V power supply is not available or sufficient.

Turning now to FIG. 5 and with continuing reference to FIGS. 1-4, an example operation of the park pawl override system 14 will now be discussed. The example method or process starts at block 150 and continues to block 160 where a determination is made that the vehicle's 12V battery power source 30 is unavailable or insufficient to operate the motor 80 of the electronic park pawl system 38 to disengage the park pawl 68 to allow rotation movement of all of the vehicle's axles/wheels. Once this determination has been made, the method continues to block 170 where the battery 30 is disconnected from the wiring harness 26. At blocks 180 and 190, the breakout interface/connector 44 is accessed, such as by opening the glove box 138, and the park pawl override tool 48 is connected to the breakout connector 44 via connectors or terminals 114.

Once the override tool 48 is connected, the auxiliary, off-board 12V power source 58 is then connected to the terminals 126 on the override tool 48 at block 200 to provide a power supply to the same. The override tool 48 can then be turned on via switch 118 at block 210. At this point in the process, the override tool 48 can be utilized to disengage and, if needed, reengage the park pawl 68 to the park wheel 72. As an example, in the current situation discussed above, the park pawl 68 is engaged and is required to be disengaged to move the vehicle 10. To disengage the park pawl 68, the directional switch 122 is moved or rotated in the first direction at block 220 to move the activation cone 88 in its first direction 132 to provide for disengagement of the park pawl 68. As previously mentioned, the display 130 will provide an indication of the direction or movement and location of the park pawl 68 so the user or operator can visually see/confirm that the park pawl 68, for example, is moving in the direction of disengagement and has reached full disengagement.

Once the park pawl 68 is determined to be fully disengaged via at least information provided via display 130, the override tool 48 can be turned off via switch 118 and disconnected from the breakout connector 44 at block 230 and the process ends at block 240. The vehicle 10 can now be moved without potentially damaging mechanical components and/or without causing unnecessarily wear and tear on components, such as the tires, which would need to be dragged to move the vehicle 10 if the park pawl 68 remained engaged. For example, the vehicle 10 could now be pulled onto a flatbed tow truck with all wheels freely rotating. If necessary, the process can be followed again in a similar manner to reengage the park pawl 68.

The park pawl override systems and methods discussed herein provide an efficient, cost effective and secure solution to the drawbacks of existing park pawl override systems. The system and methods of the present application provide the ability to simply disengage (and reengage if necessary) the park pawl when the same is "stuck" in the engaged position due to loss of 12V vehicle power and/or a serial communication failure or fault condition. The park pawl can be disengaged electronically without having to crawl under the vehicle, and the override tool provides visual confirmation of the position of the park pawl so that a user can be informed when the park pawl is engaged and/or disengaged via the park pawl override tool. This visual feedback helps to ensure proper operation, securement and safety of the vehicle and the user/operator.

As used herein, the terms "comprise", "comprising", "includes", "including", "has", "having" or any contextual variants thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive or and not to an exclusive or. For example, a condition "A or B" is satisfied by any one of the following: A is true (or present) and B is false (or not present), A is false (or not present) and B is true (or present), and both A and B is true (or present).

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

It will be appreciated that the term "controller" or "module" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An override system for an electronic park pawl system of a vehicle, the override system comprising:

a park pawl override tool configured to selectively control engagement and disengagement of a park pawl mechanism of the electronic park pawl system under certain vehicle conditions including loss of vehicle 12V power supply and/or loss of vehicle serial communication with at least the electronic park pawl system, the park pawl override tool being a portable tool configured to be selectively engaged and disengaged to/from the vehicle;

a breakout interface configured to selectively receive the override tool to connect the override tool to the vehicle; and a dedicated, direct communication and power connection between the breakout interface and the electronic park pawl system, the dedicated, direct communication and power connection being independent of and in addition to a connection of the electronic park pawl system with the vehicle 12V power supply;

wherein with the override tool coupled to the breakout interface, the override tool is configured to facilitate power and control signal communication to the electronic park pawl system to control the park pawl mechanism to selectively move to a disengaged position and to an engaged position while the vehicle is under the condition of loss of the vehicle 12V power supply to at least the electronic park pawl system.

2. The park pawl override system of claim 1, wherein the override tool includes a directional input switch, a 12V auxiliary power connection, and a control system in communication with the directional input switch, the 12V auxiliary power connection, and the electronic park pawl system when the override tool is coupled to the breakout interface.

3. The park pawl override system of claim 2, wherein the control system is configured to receive a signal from the directional input switch indicative of at least a direction of movement of the park pawl mechanism and command the park pawl to move in said direction of movement.

4. The park pawl override system of claim 3, further comprising an independent, auxiliary, off-vehicle 12V power supply configured to be selectively connected to the 12V auxiliary power connection to provide a supply of power to the override tool.

5. The park pawl override system of claim 3, further comprising a display in signal communication with the control system and configured to provide a visual indication of a position and direction of movement of the park pawl mechanism relative to and including positions of full engagement and disengagement.

6. The park pawl override system of claim 5, wherein the electronic park pawl system includes one or more position sensors in signal communication with the direct communication and power connection and configured to provide position and direction of movement information to the control system of the override tool.

7. The park pawl override system of claim 6, wherein the one or more position sensors includes a quadrature sensor.

8. The park pawl override system of claim 1, wherein the dedicated, direct communication and power connection between the breakout interface and the electronic park pawl system is in addition to a wiring harness and controller area network communication system provided with the vehicle.

9. The park pawl override system of claim 1, wherein the breakout interface is positioned in a glove box area in an interior of the vehicle.

10. The park pawl override system of claim 1, wherein with the override tool coupled to the breakout interface, the override tool is configured to facilitate power and control signal communication to the electronic park pawl system to control the park pawl mechanism to selectively move to the disengaged position and to the engaged position while the vehicle is under the condition of loss of the vehicle serial communication with at least the electronic park pawl system.

11. A method of using an override system to control an electronic park pawl system of a vehicle, the method comprising:

providing a portable park pawl override tool configured to control selective engagement and disengagement a park pawl mechanism of the electronic park pawl system under certain vehicle conditions including loss of 12V power and/or loss of vehicle serial communication with at least the electronic park pawl system;

disengaging a 12V power supply of the vehicle from a wiring harness of the vehicle;

selectively connecting the portable park pawl override tool to a breakout interface on the vehicle to connect the portable park pawl override tool to the vehicle, wherein the vehicle includes a dedicated, direct communication and power connection between the breakout interface and the electronic park pawl system, the dedicated, direct communication and power connection being independent of and in addition to a connection of the electronic park pawl system with the 12V power supply of the vehicle;

selectively connecting an auxiliary, off-vehicle 12V power supply to the park pawl override tool; and operating the park pawl override tool while selectively connected to the breakout interface to provide power and control signal communication to the electronic park pawl system to control the park pawl mechanism to selectively move to a disengaged position and/or to an engaged position while the vehicle is under the condition of loss of 12V power to at least the electronic park pawl system.

12. The method of claim 11, wherein the override tool includes a display and the override tool is configured to provide a visual indication of a position and a direction of movement of the park pawl mechanism to the display so as to be viewable by an operator of the override tool.

13. The method of claim 11, further comprising accessing the breakout interface in a glove box area of an interior of the vehicle.

14. The method of claim 11, wherein the dedicated, direct communication and power connection between the breakout interface and the electronic park pawl system is in addition to and distinct from the wiring harness and the 12V power supply provided with the vehicle.

15. The method of claim 11, further comprising operating the park pawl override tool while selectively connected to the breakout interface to provide power and control signal communication to the electronic park pawl system to control the park pawl mechanism to selectively move to the disengaged position and to the engaged position while the vehicle is under the condition of loss of vehicle serial communication with at least the electronic park pawl system.

* * * * *